Dec. 21, 1937.  W. H. SPAYD  2,102,758
CLEANER FOR VEGETABLES
Filed Nov. 18, 1936   2 Sheets-Sheet 2
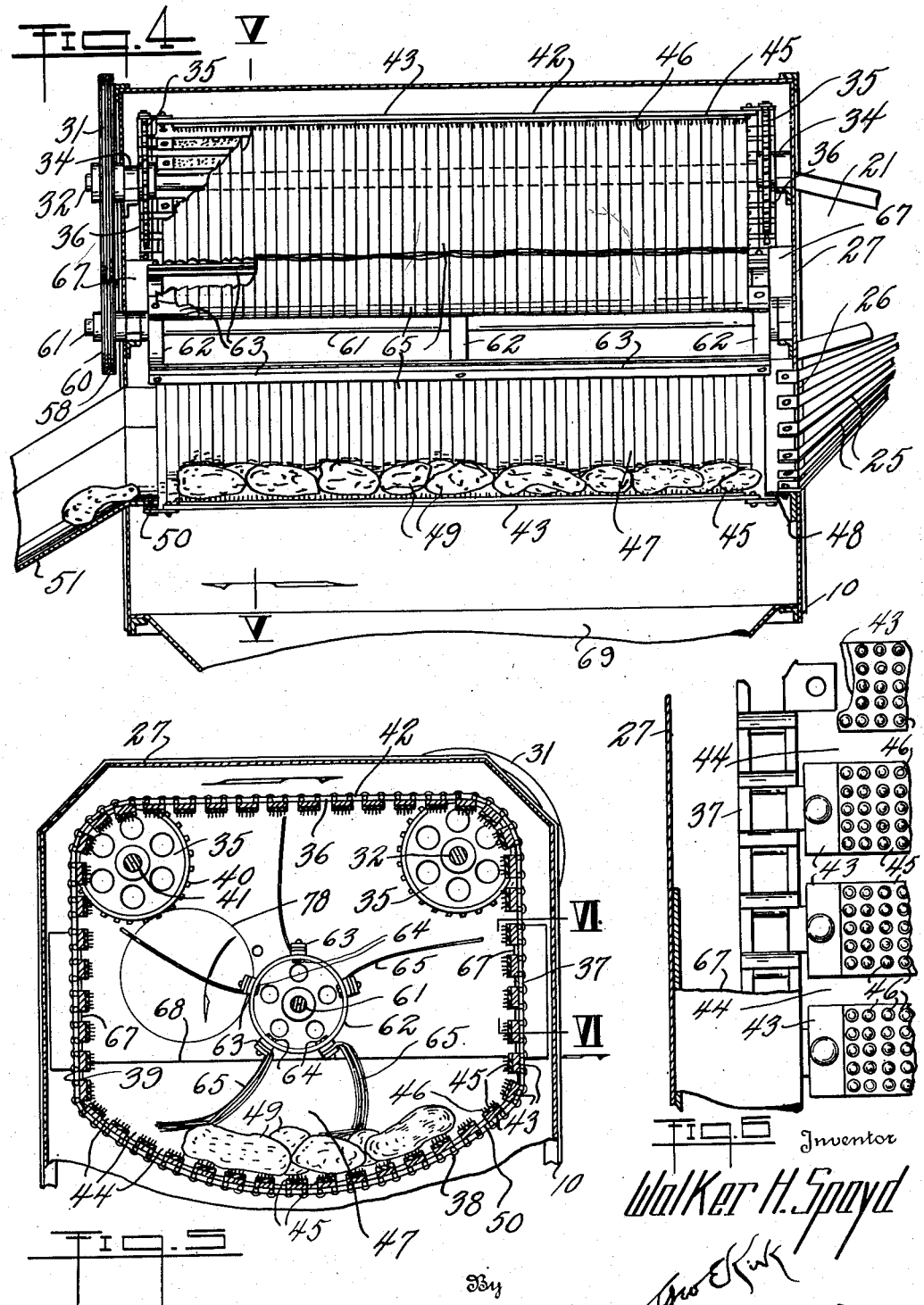
Inventor
Walker H. Spayd
By
Attorney Patented Dec. 21, 1937

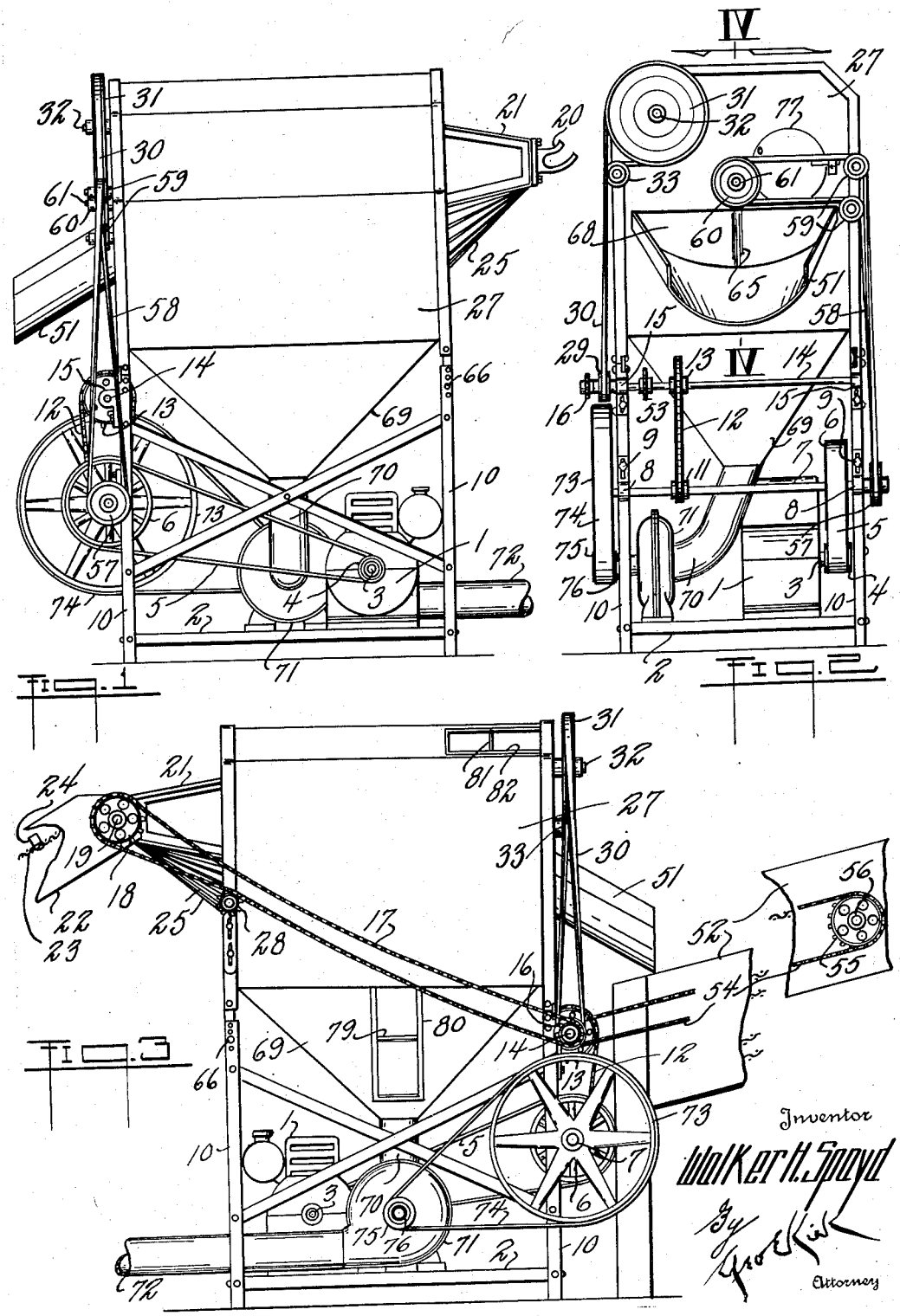

2,102,758

UNITED STATES PATENT OFFICE 2,102,758

CLEANER FOR VEGETABLES

Walker H. Spayd, Van Wert, Ohio

Application November 18, 1936, Serial No. 111,340

3 Claims. (Cl. 146—202)

This invention relates primarily to treating vegetables and fruits, more especially for removing more or less loose or foreign material therefrom.

This invention has utility as a continuous wiper or cleaner for potatoes.

Referring to the drawings:

Fig. 1 is a side elevation of an embodiment of the invention in a cleaner;

Fig. 2 is a view from the left of the device of Fig. 1;

Fig. 3 is a view of the device of Fig. 1 from the opposite side, parts being broken away;

Fig. 4 is a section on the line IV—IV, Fig. 2;

Fig. 5 is a section on the line V—V, Fig. 4; and

Fig. 6 is a section on the line VI—VI, Fig. 5.

Source of power as gas engine 1 is mounted on base 2 (Fig. 2) and has shaft 3 carrying pulley 4, from which extends belt 5 about pulley 6 on shaft 7 mounted in bearings 8, adjustably mounted by bolts 9 in upright frames 10. Fixed on this shaft 7 is sprocket wheel 11, from which extends chain 12 to sprocket wheel 13 on shaft 14, mounted in bearings 15 carried by the uprights 10 above and parallel to the shaft 7. The shaft 14 is provided with sprocket wheel 16, about which extends sprocket chain 17 (Fig. 3) to sprocket wheel 18 on shaft 19 in hooks 20 (Fig. 1) of receiving hopper 21 mounted on the frame uprights 10. This shaft 19 is fixed with elevator flight housing 22 carrying endless belt conveyor 23 having flights 24 thereon, effective for elevating and delivering material into the hopper 21 so that such material, say potatoes, in falling may land on slats 25 for foreign or loose material or dirt to clear therefrom before the product passes through opening 26 (Fig. 4) into housing 27.

The sprocket chain 17 has its lower reach contacted by adjustable idler 28. Mounted on the shaft 14, adjacent the sprocket wheel 16, is pulley 29, about which passes belt 30 to pulley 31 on shaft 32 and thence about idler 33 in its return to the pulley 29. This shaft 32 (Figs. 2, 4) is mounted in bearings 34 and extends through the housing 27. In the housing 27, this shaft 32 carries sprocket wheels 35 in mesh with sprocket chain 36 having downwardly extending section 37, crossover section 38, and riser section 39 in its lower bight, to idler or follower sprocket wheels 40 on shaft 41 parallel to the shaft 32, thus locating taut upward bight 42 horizontally in the portion of the housing 27 of this device. The parallel sprocket chains 36 have therebetween slats 43 with clearance 44 therebetween to form perforate or open work way.

Additionally, each of these slats 43 has cushioning facing 45 as of formed rubber. Provision is also taken to avoid scarring impact by providing prongs 46 of this rubber or rubber-like material rising from the cushion 45. There is thus provided a way 47 of cushioned interior and transversely traveling as to the extent of this way from the delivery chute slats 25 over shielding rim 48 to clear the sprocket chain 36 and effect the delivery of the produce, as potatoes 49, into the way 47 for progress over shield 50 in delivery to discharge chute 51, which herein may extend to grader 52. The shaft 14, adjacent the sprocket wheel 13, carries sprocket wheel 53 from which extends sprocket chain 54 to sprocket wheel 55 on shaft 56 in the grader housing 52 effective as an elevator in the actuation of this grader conveyor.

The shaft 7 has fixed thereon pulley 57 (Fig. 2) from which extends belt 58 over guide pulleys 59 to pulley 60 on shaft 61. This shaft 61 extends not only through the housing 27 but centrally through the way 47, but nearer the lower portion 38 of the lower bight than the upper taut portion 42.

This shaft 61 has hub sections 62, between which extend drum-forming clamping bars 63 assembled by bolts 64 into locking engagement for inner termini of strips 65, herein shown as narrow, ribbon-like strips of canvas in two or three plies, and loose. The drum and clamps accordingly provide a carrier in this way 47 for these flexible wiper or beater strips to swish against, over and about the produce, as potatoes, in one direction, say counter-clockwise of the direction of the way 47, as the cushioning open-work of such way oppositely travels, say herein clockwise.

Incoming material from the chute 21 is tumbled across the cushioning of the way 47 and of its volume may give a degree of progress. This may be accelerated either by tilting the frame or adjusting bolts 66 in the uprights 10. In practice, this would mean a lifting adjacent the supply chute 21 more than adjacent the delivery chute 51. The rim 48 provides a guide from the slats 25 protecting the produce from the sprocket chain 35 at this supply opening 26. Additional protection against material striking the chain to be wounded is effected by sprocket chain shields or guides 67 (Fig. 6), both for the descending portion 37 as well as the rising portion 39 of the lower bight. Accordingly, the material progresses for unwounded delivery to the shield 50 at discharge opening 68 for flow onto the discharge way 51.

It is to be noted this effect of the wipers upon the moving product is gentle but continuous and tends to separate the foreign matter or loose portions to fall through the clearance portions 44 into converging hopper portion 69 for flow by duct 70 into fan housing 71, and from thence delivered by duct 72 as may be desired. The shaft 7 has thereon large pulley 73 (Fig. 3), from which extends belt 74 to pulley 75 on shaft 76 for the fan or suction blower 71. It is thus to be noted that the single power source or motor, as gas engine 1, is effective to drive the several units herein.

Inspection for check up on condition or as against undesired material or accident in the way 47 is had by shifting closure 77 to provide opening at port 78 in an end wall of the housing 27. Should there be occasion for clearing out or inspection of the hopper 69, plate 79 may be upwardly shifted in inclined ways 80 to permit access to this hopper chamber 69. Access may also be had in the upper portion of the housing 27 outside the cushioning way or chamber 47 by shifting plate 81 (Fig. 3) in slide-way 82 to open position.

The device in the disclosure herein is a power unit effective not only for elevating supply to this cleaner but delivering the supply therefrom even by elevator and then through the grader. The unit itself of this cleaner is effective in its handling against detracting from the quality of such produce or deleteriously affecting the keeping thereof, due to abrasion or wound. The drive may be sufficiently rapid as to the fabric wipers that such may approach direct or radial extent as clear of the material. A relatively lower speed may be for the transversely traveling, cushioning-supporting way so that the material as reaching the riser section 39 may only roll down therefrom, either on unlifted portions or propressing slightly. This descent is close to, if not beyond the throw of the wipers, which wipers are more effective in the concave central portion of the reach 38 and are not of rigidity or force to effect other than slight retarding so that there is no tendency to lift or throw the produce against the descending reach portion 37.

What is claimed and it is desired to secure by United States Letters Patent is:

1. A material cleaner comprising a base, a housing mounted on the base in spaced relation above the same, parallel shafts mounted in the housing longitudinally thereof and adjacent the top thereof, sets of aligned sprockets on and adjacent both ends of the shafts and within the housing, means for driving one of said shafts, an endless belt surrounding and driven by said sprockets, the lower run of the endless belt having a substantial sag between the sprockets and forming a longitudinal runway for material being cleaned, brushing members fixed to the inner surface of the belt for brushing the material as it passes through the runway, another shaft journaled in the housing between the runs of the endless belt and carrying flexible wiping members, the last mentioned shaft extending parallel to the first mentioned shafts and situated nearer the bottom run of the endless belt, the wiping members extending into contact with the material being cleaned and means to drive said shaft.

2. A material cleaner comprising a housing, parallel shafts mounted in the housing longitudinally thereof and adjacent the top thereof, an endless belt surrounding said shafts, the lower run of the endless belt having a substantial sag sloping from one end toward the other, means for feeding to the high end material to be thereon and receiving from the lower end material to be delivered therefrom, means for propelling the belt in the direction of its endless extent, brushing members fixed to the inner surface of the belt for brushing the material as it passes along the sag, another shaft journaled in the housing and carrying flexible wiping members, the last mentioned shaft being approximately parallel to the first mentioned shafts and situated nearer the bottom run of the endless belt, the wiping members extending into contact with the material being cleaned, and means to drive said wiping member-carrying shaft, whereby said material passes transversely of the belt from said high end to said lower end.

3. A material cleaner comprising a housing, an elongated endless belt in the housing having a sag sloping from one end toward the other, means for feeding to the high end material to be thereon and for receiving from the lower end material to be delivered therefrom, means for propelling the belt in the direction of its endless extent, there being brushing means fixed to the inner face of the belt for brushing the material as it passes therealong, a rotary carrier in the sag, wiper means on the carrier for acting on the material as brushed by the belt, and driving means for the carrier whereby said material passes transversely of the belt from said high end to the lower end.

WALKER H. SPAYD.